US009977873B1

(12) United States Patent
Shoenfeld

(10) Patent No.: US 9,977,873 B1
(45) Date of Patent: May 22, 2018

(54) SECURE TRANSFER OF MEDICATIONS WITHIN HOSPITAL

(71) Applicant: Norman A Shoenfeld, Cypress, TX (US)

(72) Inventor: Norman A Shoenfeld, Cypress, TX (US)

(73) Assignee: S&S X-Ray Products, Inc., Pen Argyl, PA (US)

( * ) Notice: Subject to any disclaimer, the term of this patent is extended or adjusted under 35 U.S.C. 154(b) by 0 days. days.

(21) Appl. No.: 15/444,514

(22) Filed: Feb. 28, 2017

(51) Int. Cl.
*G06F 19/00* (2018.01)
*A61J 7/00* (2006.01)
*G05B 19/042* (2006.01)

(52) U.S. Cl.
CPC ........ *G06F 19/3462* (2013.01); *A61J 7/0084* (2013.01); *G05B 19/042* (2013.01); *A61J 2200/30* (2013.01); *A61J 2205/10* (2013.01)

(58) Field of Classification Search
CPC .. G06F 19/3462; G05B 19/042; A61J 7/0084; A61J 2200/30; A61J 2205/10
USPC .................................................. 700/231–244
See application file for complete search history.

(56) References Cited

U.S. PATENT DOCUMENTS

| | | | | |
|---|---|---|---|---|
| 6,636,780 B1* | 10/2003 | Haitin | ................ | A61G 12/001 221/2 |
| 7,155,306 B2* | 12/2006 | Haitin | ................ | A61G 12/001 700/242 |
| 7,364,067 B2* | 4/2008 | Steusloff | ................ | G06F 3/002 235/375 |
| 9,078,520 B2 | 7/2015 | Shoenfeld | | |
| 2003/0120384 A1* | 6/2003 | Haitin | ................ | A61G 12/001 700/242 |

(Continued)

OTHER PUBLICATIONS

Staggers, Nancy et al., Nurses' Evalations of a Novel Design for an Electronic Medication Administration Record, Computers, Informatics, Nursing, pp. 67-75, Mar./Apr. 2007.

(Continued)

*Primary Examiner* — Michael Collins
(74) *Attorney, Agent, or Firm* — Bernhard P. Molldrem, Jr.

(57) ABSTRACT

A process of safe, secure storage and transfer of prescription medications for patient care in a hospital, clinic, nursing home, or similar health care facility, permits the authorized user to obtain medications for multiple patients along a patient care route, place the medications in respective locking compartments for each patient, and bring the cart to each patient in turn to administer the medications. Scanning in the user ID opens the cart, and the ward or floor medications cabinet displays a 2-D bar code containing patient identification data, the user identification, and one or more delimiter characters indicating that the medication was transferred by the authorized user directly to the cart. For each patient, a patient specific drawer or compartment is unlocked and opened, and the medications are placed into it. This is repeated for each patient on the care route. At each patient bedside, the user scans in the patient ID, which opens only the patient specific drawer. If a medication is obtained when the cart is not at the cabinet, the cabinet labels the medication with a bar code containing a different delimiter. The system maintains an audit of each person handling the medication, and when each event occurred.

10 Claims, 1 Drawing Sheet

(56) References Cited

U.S. PATENT DOCUMENTS

| | | | | |
|---|---|---|---|---|
| 2004/0054436 A1* | 3/2004 | Haitin | ............ | A61G 12/001 700/236 |
| 2004/0148055 A1* | 7/2004 | Shoenfeld | ............ | A61G 12/001 700/237 |
| 2007/0088461 A1* | 4/2007 | Haitin | ............ | A61G 12/001 700/241 |
| 2008/0277473 A1* | 11/2008 | Kotlarsky | ............ | G06K 7/10722 235/462.07 |
| 2008/0302873 A1* | 12/2008 | Kotlarsky | ............ | G06F 9/44526 235/462.15 |
| 2016/0019368 A1* | 1/2016 | Shows | ............ | G06F 19/3462 700/236 |
| 2016/0089303 A1 | 3/2016 | Latorraca et al. | | |

OTHER PUBLICATIONS

Omnicell, Savvy Mobile Medication Workstation (brochure), 2013.

\* cited by examiner

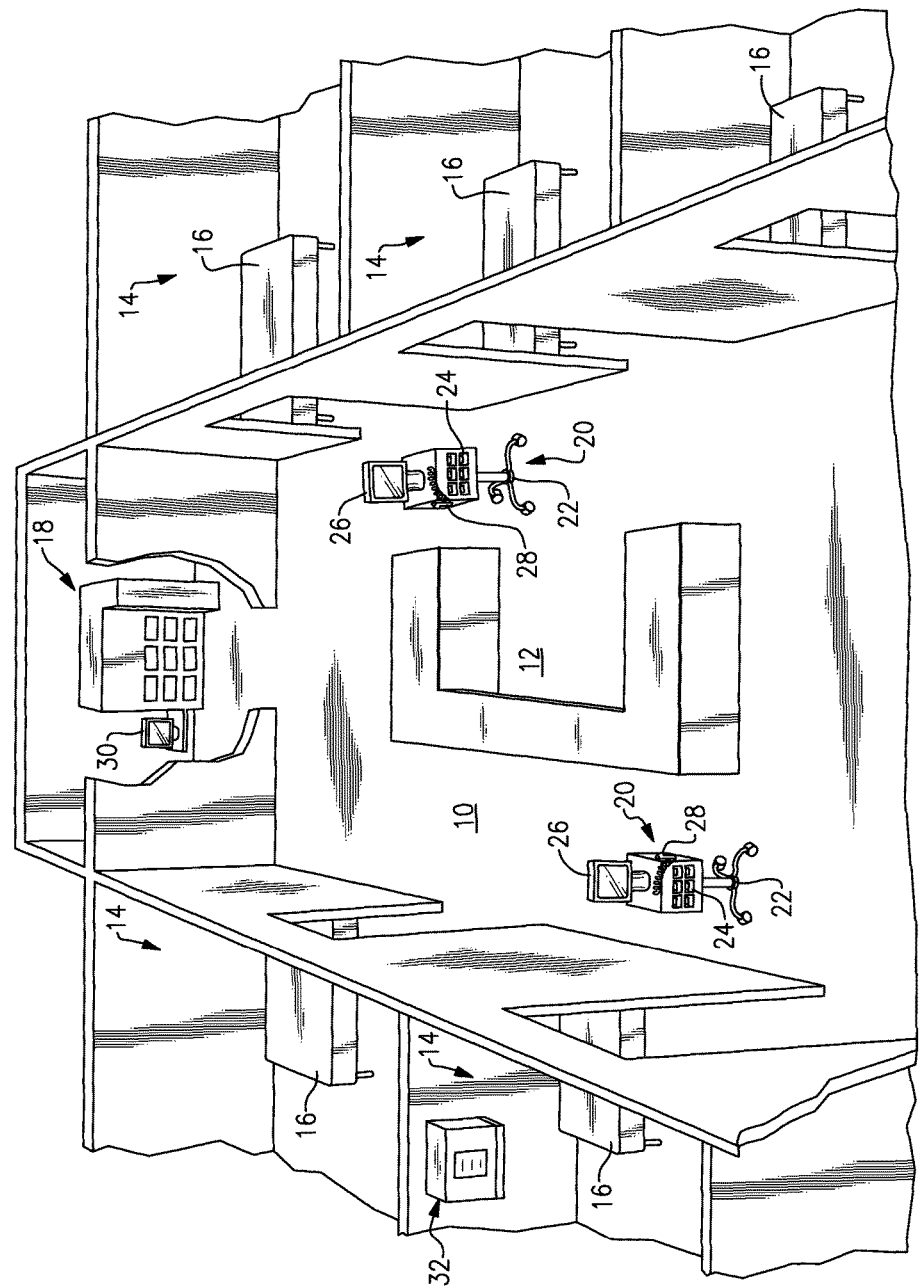

SECURE TRANSFER OF MEDICATIONS WITHIN HOSPITAL

BACKGROUND OF THE INVENTION

This invention relates to storage and transfer of prescription medications, non-prescription pharmaceuticals, medical supplies and other similar items for patient care in a hospital, clinic, nursing home, or similar health care facility. The invention is more specifically directed to a medical dispensing system with improved security and reporting of what medications have been handled, when, and by whom. The invention is more particularly concerned with tracking access to medications at a hospital pharmacy, ward or floor medications cabinet or carousel, medications cart, or patient bedside cabinet.

In any hospital or clinic, or in wards or floors of the hospital or health center, controlled access cabinets, e.g., cabinets with latching drawers or so-called carousels with rotating compartments, are used for storage of pharmaceuticals and of other limited-access medical supplies. The medications prescribed for patients need to be conveniently accessible for the authorized nursing staff but also need to be protected from unauthorized access to prescription medications, controlled substances, and high-value medical supplies. Dispensing cabinets may have a number of pull-out drawers that each have a number of compartments, with the various medications stored in them. Preferably there should be some control of access once the drawer has been opened. The compartments may be filled or replenished by pharmacy staff, and later accessed by nursing staff to administer drugs or other items to patients according to prescription orders for the patients on a given medication route. The cabinet or carousel may also contain medical supplies and medications in amounts proper for the day to day needs of the medical staff and patients, for example, non-prescription medications and supplies, hypodermic needles and syringes, and other materials that may be needed.

For drug security reasons the hospital needs to maintain a record of which supplies and which medications are stored, and in what quantities, in which locking or non-locking compartments of one or more of the drawers, and to keep track of each given medication or supply item when it is transferred from cabinet to cart or administered from the cart or bedside cabinet to a given patient.

Modern medications dispensing cabinets and carts incorporate connections for access to the hospital's computerized medications administration system, and may incorporate control mechanisms with software for unlocking functions and inventory functions. These cabinets and carts are capable of IP addressable configurations for access to the hospital network, to a personal computer or tablet, or to a hand-held device.

The cabinets and carts also incorporate a video monitor, label printer capable of printing machine-readable (e.g., bar-coded) labels, and a bar-code reader or similar input device. The cabinets and carts can also incorporate sensors in its drawers or compartment to provide open-closed status for the compartments, and to detect when a medication package has been placed into it or removed from it.

Drug security and the prevention of drug diversion are major interest items and of high importance to hospital administrators, as drug diversion (i.e., theft) and medication errors have become common and need to be prevented. Accordingly, there is a need for an improved, more secure and more efficient way to transfer medications securely within hospital.

At present, the movement of medications within a medical treatment center can involve transfer between pharmacy and a ward of floor medications cabinet, transfer by nursing staff within the ward from the medications cabinet to a medications cart, and/or administration of the medications from the cart (or from a bedside cabinet in the patient room) to the patient. Also, the medications can be taken from the ward medications cabinet, one at a time or a few at a time, by nursing staff and carried, e.g., on a medications tray to a given patent for administration to the patient, or to a few patients on a given medications route in the ward or floor. The medications can be pulled by the nurse staff, obtaining multiple medications at one time for a given patient, labeling the medications containers, and placing them on the cart or tray. The specific nurse may need to log on to the medications cabinet and onto the medications cart, load the cart, and then deliver the medications to the patients on the route and administer the medications to each patient. Hospitals may have an electronic medication administration record software system (i.e., eMAR) to assist in ensuring that the right drug is administered at the right time and right amount on the right route to the right patient. However, the eMAR system does not track who has handled the medications at each stage, or when the medications were transferred to or from the pharmacy, the ward or floor cabinet (or carousel), the medications delivery cart, or the patient bedside cabinet.

In order to address these medications security issues, it is important that each time a medications is obtained from pharmacy, or from the floor or ward cabinet, that the prescription medication can be stored within an automatically labeled and individually locked patient drawer in the cart or in the bedside cabinet. Then when the time comes to administer the given medication to the patient on the medications care route, that the patient drawer or compartment can be accessed by the assigned nurse or staff member, who provides machine readable identity of both the care staff member and the patient. This needs to be accomplished in a way so that login time is minimized and access is limited only to medications for that one patient at the patient's bedside.

OBJECTS AND SUMMARY OF THE INVENTION

Accordingly, it is an object of this invention to provide a medical dispensing process and system that avoids the drawbacks of the prior art.

It is another object to provide a medications distribution and delivery system in which the medications cabinet and medications carts can interact with the care staff or nurse staff member and with the patient to ensure that authorized persons are administering the prescribed medications only to the intended patient, and that a tracking record of time of access and identity of each person is kept for cart and cabinet.

It is still another object to track whether a given medication or container was obtained from the ward or floor cabinet (or carousel), or from pharmacy, or elsewhere, and by whom, with that information remaining on the medication up until the time of administration.

The system of this invention can be practiced using available a locking medication cabinets and carts in which the locking mechanism of the drawers and/or compartments is a straightforward, electro-mechanical design.

The medical transfer and administration arrangement of this invention can be explained in terms of cabinet-to-cart workflow and bedside workflow.

At the cabinet, the authorized user, typically an assigned nurse from the given floor or ward, with the cart next to him or her, accesses the medications cabinet to obtain the medications as prescribed for a given patient on the user's medical care route. Upon doing so the software in the medications cabinet causes a display device on the cabinet to display a bar coded symbol, e.g., a 2-D barcode, which contains the authorized user's ID as well as the patient' ID, and uses a special character or delimiter, e.g., a dash or hyphen "-". This delimiter indicates that the nurse (or other authorized user) obtained the medication from the medications cabinet in the usual course of obtaining the prescription medications for the patients that the authorized user is responsible for.

At this point the scanner on the cart is now to used read and scan-in a 2-D bar code displayed on the cabinet monitor. This information logs in the user of the car with no additional steps required. While not preferred, the method can involve scanning in a user ID, e.g., from the nurse's ID badge. The information on the 2-D bar code automatically logs in the user to the cart, as the user has already been verified by the cabinet software, and repeating this login information is not necessary, saving a time-consuming step. The authorized user is now logged on to the cart, and for most purposes no further input is required, as long as the user remains in the vicinity of the cart. In other words, the nurse or other authorized user remains logged in to the medications cart so long as the user remains near the cart, and so the user does not have to log-in for each patient on the route. Later during the patient rounds, the user scans in the patient ID, usually on a patient ID card or patient bracelet or wrist band. At this point the cart software checks the compartments or bins of the cart to find any that correspond to the patient ID. If a match is present and one bin or compartment has been previously assigned to that patient, then the bin or compartment is unlocked or opened, and is graphically identified (e.g., in the software, or by illuminating an LED on the compartment door). If there is no match for that patient, then the bins or compartments are all scanned to find out if any are unassigned to a patient, and the first of those that does not have a patient assigned is unlocked, labeled in the cart's computer control as being now assigned to the patient. The cart may display the patient information on the cart's monitor. For a cart without individualized drawer or compartment locking, the one corresponding bin can be identified at the display, and in some cases an LED on the compartment can be illuminated. Only the compartment identified for that patient would be identified on the display. If a drawer other than the correct one is incorrectly or forcibly opened, an alarm will be displayed to indicate that the wrong bin or compartment has been accessed.

Now the medications prescribed to this identified patient are taken from the cabinet or carousel and placed into the opened patient-specific bin or compartment on the cart. If more than one bin is needed to store bulky medications or other items, the authorized user has the option of assigning a second bin or compartment to that patient, and an unlabeled bin in the cart can now be selected for the patient, opened and loaded with the additional medications. The bin(s) or drawer(s) are then closed. Then the same procedure applies for any successive patients on the authorized user's medications care route, until each patient's medications are stored in one or more drawers, bins, or compartments assigned for that patient. A drawer for supplies and non-prescription items can be accessed as long as the authorized user is logged in.

At the cabinet or carousel, the bin inventory for the cart is augmented by the same amount of medications as removed from the cabinet for that patient, via a data exchange between databases on the server, i.e., a cabinet database and a respective cart database.

At the patient's bedside, the nurse or other authorized user logs into the cart e.g. by scanning an ID barcode on his or her badge, or by manual entry on a keyboard, or by a biometric scan such as face recognition or fingerprint recognition. Then the patient ID (e.g., wristband) is scanned. At this time the cart unlocks and opens the drawer(s) or bin(s) or compartment(s) assigned to that patient, in addition to any supply drawers previously designated as such in the software configuration. Now, the nurse or authorized user removes the medications from the patient's drawer or compartment, and administers them as directed, and the medications administration is recorded using the hospital eMAR system. The patient's bin inventory is reduced by the number of medications removed from the cart and administered to the patient, again using the hospital eMAR system. When the medications have all been removed from the cart bin or compartment, the cart computer identifies that bin or compartment as empty and it becomes available to be assigned to another patient. The inventory increase/reduction can be carried out automatically using the hospital system, or the nurse may press an "empty bin" push-button to clear the bin inventory in the host database.

In the event that there is a wrong medication in the patient-specific bin or compartment, or an oversupply of the prescribed medication is present, or the medication is rejected by the eMAR, the surplus or waste medication is returned in the cart to the floor or ward medications cabinet. When logging in to the cabinet, the user scans in the user and patient ID, which opens the cart bin or compartment for that patient. The returned medications are then removed and returned to the cabinet, e.g., to a waste or return drawer, according to cabinet protocol for return or waste medications. The user (nurse) can identify the patient bin or compartment as "empty" when the returned medications have been removed, making that bin or compartment available to be re-assigned to a patient.

For transfer of medications from the pharmacy or the cabinet directly to the cart or to a bedside cabinet when the cart is not present in pharmacy or next to the floor or ward cabinet, a modified protocol is followed.

In this case, a bar-coded label is printed out for the medications container, containing the patient's ID with a different delimiter, e.g., an octothorp (#) rather than the dash or hyphen (-) to signify that the patient's medication was not transferred directly from the cabinet to the cart. The label is placed on the container holding the patient's specific prescribed medications. Then the medications are transported to the cart or to the patient's bedside cabinet. At that location (cart or bedside cabinet) the cart software (or cabinet software) asks the user to log in, which the user does with the identity card or other machine-readable identity, e.g., finger print, facial recognition, etc. This identifies the person delivering the medication, who may be different from the user who packaged the medication or the person administering the medication. This may require a secondary biometric scan. Then as discussed earlier a patient-specific bin on the cart (or on the bedside cabinet) is unlocked and opened, or if need be an unassigned bin or compartment is labeled for the patient and is opened. The bin or compartment is pushed closed, and the medications can be administered as described earlier.

This system keeps an audit trail or record for the identity of the person who packaged the medication, for the person who delivered the medication to the cart, and for the person who administered the medication to the patient, as well as the dates and times that the associated bin or compartment was opened and locked. The medications amounts present in each bin or compartment can be calculated based on what has been removed from the cabinet and from the cart, and what has been administered to the patient, using the hospital eMAR system.

In accordance with an aspect of the present invention, a medication dispensing method or system improves the administration of prescribed medications to patients on a patient care route within a care facility, wherein an authorized medications dispensing user has a machine-readable user identification and each such patient also has a machine-readable patient identification. An authorized dispensing user, e.g., a registered nurse, brings a medications dispensing cart to a central medications cabinet or carousel in the care facility. The medications cart includes a plurality of individual locking medications compartments, a viewing screen, a coded symbol reader, and a suitably programmed processor. The authorized dispensing user presents his or her user identification to an ID reader of the central medications cabinet or carousel whereupon the cabinet or carousel displays a coded symbol. The coded symbol contains data identifying the user, data identifying one of said patients on said patient care route; and an added character indicating that the authorized dispensing user is present with the medications cart at the central medications cabinet or carousel.

The authorized dispensing user scans the displayed coded symbol with the coded symbol reader of the cart, whereupon the programmed controller of the cart assigns one of the various locking compartments of the cart to that one patient, and unlocks or opens the assigned compartment.

The nurse or other authorized dispensing user obtains the medications prescribed for the one patient, places the medications into the assigned compartment, and closes the compartment.

At this point, the screen of the central medications cabinet or carousel displays a successive coded symbol that contains data identifying the authorized dispensing user, data identifying a successive one of the patients on the patient care route, and the at least one additional character.

The nurse or other authorized dispensing user repeats the aforementioned steps for identifying the patient and loading the medications for each of the patients on the patient care route.

Thereafter, the authorized dispensing user brings the mobile medications cart to a bedside of one of the patients on said patient care route. There the authorized dispensing user scans, with the coded symbol reader of the cart, the machine-readable identification (e.g., card or tag) of the dispensing user, followed by the machine-readable identification of that one patient, usually by scanning a wrist band. Thereupon, the programmed controller of the cart unlocks or opens the medications compartment of said cart which has been assigned to that one patient. Then, the nurse or other authorized dispensing user removes each of the patient's prescribed medications from the compartment and administers each such medication to that one patient, and closes the medications compartment of the cart. Then the nurse or other authorized dispensing user brings the mobile medications cart to a bedside of a successive one of the patients on the patient care route; and repeats the steps mentioned above for each of the patients on the patient care route.

For each patient, the nurse or other provider may scan a coded label on each prescribed medication with the coded symbol reader. This system may be used with the hospital's existing electronic medications administration record (eMAR) system, such that the prescribed medications are dispensed and administered according to the protocol of the existing eMAR system.

The present invention may also account for any medications that are dispensed other than by loading the cart at the ward or floor cabinet or carousel. The method can involve transferring at least one unit of medications for a selected patient on the care route, and taking the medication from the central medications cabinet or carousel to the cart or to a bedside cabinet when the authorized dispensing user does not have the cart present at the central medications cabinet or carousel.

In this case, the nurse or other authorized dispensing user presents his or her user identification to the ID reader of the central medications cabinet or carousel. The authorized dispensing user obtains from the cabinet or carousel one or more units of medication for the patient on the patient care route. The cabinet or carousel prints out for each such unit of medication a label containing a coded symbol, where the coded symbol contains data identifying the authorized user, data identifying the patient, and an added character different from the first-mentioned added character, here indicating that the authorized dispensing user is not present with said medications cart at the central medications cabinet or carousel. The authorized dispensing user then brings the unit or units of medication to the cart or to the patient's bedside cabinet and scans his or her identity tag with the coded symbol reader on the cart or on the bedside cabinet, and scans the identification of the patient. This action unlocks or opens the medications compartment of the cart which has been assigned to that patient. The authorized dispensing user scans the coded symbols of the labels for the at least one additional medication with the coded symbol reader and placing the additional medication in the medications compartment.

Each time a medication is dispensed from the central medications cabinet or carousel when the cart is not present, the system generates the coded symbol with data identifying the dispensing act as well as the identity of the person obtaining the medication. If there is not a drawer or compartment assigned to the intended patient for the medication when the material is brought to the cart or to a bedside cabinet, the cart or bedside cabinet automatically assigns and labels an unassigned compartment for the patient.

The system maintains an audit trail of what medications, and when and by whom the medications have been removed from the cart, and time each given compartment on the cart was opened.

The above and many other objects, features, and advantages of this invention will become apparent from the ensuing description of a selected preferred embodiment, which is to be considered in connection with the accompanying Drawing.

BRIEF DESCRIPTION OF THE DRAWING

The Sole Drawing FIGURE is a perspective schematic view of a patient ward in a hospital or other patient care facility, for explaining the methodology involved in embodiments of the present invention.

DETAILED DESCRIPTION OF THE PREFERRED EMBODIMENT

Mobile medication workstations, i.e., wheeled carts with network-connected computer device and medications drawers or compartments, have become commonplace in hospitals and other patient care centers, as these improve nurse efficiency and enable the nurses to spend more time with patients and less time in administrative chores. In particular, these allow the nurse or other authorized patient-care professional to obtain the ordered prescription medications for a number of patients on the nurse's care route, so they can be administered to the patients without having to return time and again to the ward medications cabinet or floor medications cabinet. Frequently, there is a waiting time for the nurse to fill a patient's prescription order at the medications cabinet, which again reduces the amount of time the nurse can spend actually caring for the patient. Moreover, when the nurse needs to walk from the patient room to the pharmacy or the ward cabinet for each patient, the nurse may have to walk up to five miles per shift, causing fatigue and that may lead to medication errors. Accordingly, the use of these medication carts serve as a tool for the nurses to manage patient medications more efficiently and in a way where they can also avoid distractions and interruptions.

Hospitals, clinics, and patient care centers now routinely employ an electronic medication administration record, or eMAR, to ensure that the correct medication is given to each patient, at the correct time and correct dose, i.e., ensuring the "Five Rights"—right patient, right medicine, right dose, right time, right route—are observed. The eMAR system is used to document medications given or to provide reasons they are not given, and this record is maintained hospital-wide. There are a number of software providers now that provide eMAR systems.

This invention is directed to a drug security technique that keeps an audit trail or record of the dispensing user, i.e., nurse, as well as the pharmacy personnel or nurse who may have packaged the medication in the pharmacy or at a remote pharmacy, the patient ID, and the time the patient-labeled compartment or drawer was opened and time it was closed, and, if desired, the sequence number of the original dispensing or packaging done in the pharmacy. This information is tracked in addition to the hospital's eMAR system and does not interfere with that. In order to satisfy patient privacy laws and regulations, the information linking the prescription medications to patients is not stored on the cart.

In the secure transfer arrangement of this invention, each patient on the care route for a given provider is assigned a patient-specific bin, drawer, or compartment for the patient's medications. The bin or drawer or compartment is labeled electronically for that patient, and the cart only permits access to that bin, drawer, or compartment when the cart is in the vicinity of the patient. The cart does not store patient-specific information, and thus avoids any conflict with HIPPA or other privacy rules. The cart works in cooperation with existing electronic medication administration record systems, and does not replace the eMAR system. The objective of this invention is to limit access to a cart, and to provide a more secure and safer means for transport of the medications between the pharmacy or medications cabinet (or carousel) and the patient.

The sole drawing FIGURE schematically illustrates a hospital ward in which there is a central hallway or atrium 10 with a nursing station 12, and this is surrounded by a number of patient rooms 14, each with a patient bed 16. At one end of the ward, a ward medications dispensing cabinet 18, which can be a free-standing cabinet, wall-mounted cabinet, or carousel, is situated in a pharmacy room, and is configured to dispense medications according to prescription orders for the patients in the rooms 14 in the ward. One or more medications carts or mobile work stations 20 may be present, as shown in the hallway next to the nursing station 12. These can take on any of a number of configurations, but typically will have a wheeled base or pedestal 22, a number of drawers or compartments 24, an associated PC or similar computer with a monitor or viewing screen 26, and an optical scanner 28 capable of reading 2-D bar coded labels. The drawers or compartments 24 each have a latch mechanism which is controlled to lock or release under control of the computer. Each of the drawers can be labeled, i.e., identified on the computer, as being assigned for a specific patient in one of the rooms on the route at the time the nurse picks up the medications for the patient. The nurse brings the cart 20 to the central dispensing cabinet 18 and picks up the medications, in turn, for each patient on an assigned patient care route. In this example, the route may be the patients in rooms on the right-hand side of the ward, and another route may be the patients in rooms on the left-hand side of the ward. The ward or central cabinet 18 includes a computer processor for controlling the dispensing of its contents, and here has a display monitor 30, and may also have a label printer to obtain labels identifying the prescription medications to place on containers for the medications. In some configurations, the labeling of the given drawers or compartments on the cart may be only in the computer memory, without any visible identification of the patient to which it is assigned, but in some cases the cart may display the patient's name in a way that becomes visible when the nurse brings the cart to that patient's bed side and scans the patient ID bracelet or wristband to open the cart 20. In other cases, visible devices, e.g., flashing LEDs, may become visible on the assigned drawer when the patient's ID is scanned in.

The nurse (or other authorized user) scans in his or her identity, i.e., an identification tag or badge, using the scanner 28 on the cart, then brings the cart 20 to the central medications cabinet 18 to obtain the prescribed medications for each of the patients on his or her care route. Alternatively, the user can log in using biometric identification, e.g., thumb print, retinal, or face recognition, or may log in manually by entering a password or PIN. For each patient, the patient identity is displayed on the monitor 30, and this can be scanned in using the cart scanner 28. Once this scan is done, the computer processor on the cart identifies a drawer or compartment 24 on the cart and opens it, if one has been already assigned to that patient. If no drawer or compartment is already labeled for that patient, then the cart on-board computer looks for an unassigned drawer or compartment, and assigns one of those to that patient, labels that drawer or compartment, and opens it. The nurse or authorized user obtains the prescribed medications that are delivered to her or him from the cabinet 18, and places them in that drawer, and when this has been done, he or she pushes the drawer or compartment shut. Then the next patient is identified and a coded symbol for that patient is displayed on the cabinet monitor 30. The nurse scans this in on the cart scanner 28, and the cart opens the drawer labeled for that patient (or assigns an empty, unlabeled drawer), and the nurse obtains the medications for that patient and places them in the drawer or compartment for this second patient. This procedure is repeated for each patient on the patient care route that the nurse has been assigned to. Then the nurse can wheel the cart from the vicinity of the central cabinet 18 to the patient rooms 14 on her or his route.

At the patient bedside, when the nurse and cart are in the vicinity of the patient, the nurse can scan in the patient's ID bracelet (or other identity mechanism) using the scanner 28. The patient's identity will then be displayed on the cart monitor, and the cart opens the patient-specific drawer or compartment 24 for that patient. In some cases, especially if there are bulky materials ordered for the patient, such as an intravenous solution bag, for example, a second drawer or bin may also be labeled for that patient, in which case both drawers or compartments would open. The medications are removed from the drawer and can be administered to the patient. The drawers or bins that are labeled for other patients in that care route remain closed and locked. A sensor in each drawer or cabinet may signal that a given drawer has been emptied, but this information may also be entered by the nurse pushing a "drawer empty" button or similar technique, or from inventory data. Once a drawer or bin is empty, it is available for reassignment and can be re-labeled for another patient. During administration of the medications the nurse or user employs the hospital eMAR system to ensure the medication is being properly and safely given to the patient. Bin or drawer inventory will be reduced by the number of medications administered using the eMAR for that patient.

Rejected or improper medications, i.e., rejected by eMAR, can be returned to the patient bin. When the nurse later returns to the central cabinet 18, he or she scans in the user ID and the patient ID to open that patient specific drawer or compartment, and then these medications can be removed and placed into the cabinet return compartment, according to the hospital protocol for wrong, unused, or waste medications.

After the nurse or authorized user has completed his or her interaction with the patient, he or she can then proceed to another patient room on the route, and repeat this procedure at that patient's bedside. This is repeated until all the patients have been visited. In some cases, the medications are placed into locking drawers or compartments in a bedside cabinet, e.g., cabinet 32. These cabinets may be pre-filled by pharmacy personnel, and would be accessed by the authorized user (nurse) using the same technique of scanning in the user ID and the patient ID On occasion, a medication may not be available in the ward central medications cabinet 18, and has to be obtained directly from pharmacy, and hand-carried to the patient's ward. The safe, secure transfer procedure employed in this invention accommodates the transfer of medications from the pharmacy (or from the central cabinet) to a cart or to a bedside cabinet when the cart is not in the pharmacy or next to the cabinet.

In this case, when the authorized user accesses the medications for a given patient, a printer at the cabinet 18 prints out a bar-coded label with data corresponding to the user's ID and the patient's ID, and with an additional character (or characters) to serve as a delimiter. In an example, the delimiter can be an octothorpe (#) rather than the hyphen or dash (-) employed in the example described before. Then the label is attached onto the container for this patient's medication. The medication is then carried, e.g., by hand, to the cart 20 or to the bedside cabinet 32 where the label is scanned. The cart software (or software in the bedside cabinet) asks the user to log in to learn who is bringing the medications, as this may be different person from the authorized user that packaged the medication. This may alternatively be accomplished by a biometric scan rather than from the ID card. In the same manner as described earlier, this action either opens a pre-labeled bin or drawer, or else if no drawer is specified for that patient, the cart can assign one of the empty drawers or bins, as discussed earlier. The audit trail preserves a record of the identity of the person who packaged the medication, the person who opened the cart and placed the medication into the cart, and the person who opened the patient-specific bin or drawer, as well as the patient ID and time the bin or drawer was opened, what medication was present in the bin or drawer, when the bin or drawer was opened, and when it was locked, and when the medication was administered, (using the eMAR). This information is vital when investigating drug diversion, and can be difficult to piece together using current methods.

In addition, pharmacy personnel may have supervisory authority to access all the bins on the cart, each time with the cart monitor presenting a drawer or bin ID corresponding to the patient ID. This process achieves improved security and control over pharmaceuticals that must travel between the central cabinet and the bedside, and back in some cases. This requires only a few additional actions for the nurse or authorized user, namely, scanning bar codes off a cabinet monitor, scanning patient ID's to open a patient-specific bin or drawer; wheeling the cart to the cabinet; and identifying which bins or drawers are empty (although this may be done automatically by the cart). The process results in reduces nurse actions, namely, no need to place medications into a bag and seal the bag; no need to label a bag with the patient ID and initials; and fewer trips to the central cabinet for a given round. More importantly, there is no need to log into the cart separately—once the user is verified and logged in to the cabinet and the displayed 2-D bar code is scanned, the user has access to the cart without an additional log-in step.

While the invention has been described hereinabove with reference to selected preferred embodiments, it should be recognized that the invention is not limited to those precise embodiments. Rather, many modification and variations would present themselves to persons skilled in the art without departing from the scope and spirit of this invention, as defined in the appended claims.

What is claimed is:

1. Method of administering prescribed medications to patients on a patient care route within a care facility, wherein an authorized medications dispensing user has a machine-readable user identification and each said patient has a machine-readable patient identification; the method comprising:

(a) one said authorized dispensing user bringing to a central medications cabinet or carousel in said care facility a mobile medications cart, the medications cart including a plurality of individual locking medications compartments, a viewing screen, a coded symbol reader, and a suitably programmed processor;

(b) the authorized dispensing user presenting the user's user identification to an ID reader of the central medications cabinet or carousel, whereupon the cabinet or carousel displays a coded symbol, the coded symbol containing data identifying said user, data identifying one of said patients on said patient care route; and an added delimiter character selected from a plurality of delimiter characters each indicating a different dispensing condition, and a predetermined first one of said delimiting characters indicating that the authorized dispensing user is present with said medications cart at said central medications cabinet or carousel;

(c) said authorized dispensing user scanning the displayed coded symbol with the coded symbol reader of said cart, whereupon the programmed controller of said cart assigns one of said locking compartments of the cart to said one patient and unlocks or opens the assigned compartment;

(d) said authorized dispensing user obtaining one or more medications prescribed for said one patient, placing said one or more medications into said assigned compartment, and closing said compartment;

(e) said screen of said central medications cabinet or carousel displaying a successive coded symbol that contains data identifying said authorized dispensing user, data identifying a successive one of the patients on said patient care route, and said at least one additional delimiter character; and (f) said authorized dispensing user repeating the aforesaid steps (c) to (e) for each of the patients on said patient care route.

2. The method of administering prescribed medications according to claim 1, further comprising:

(g) said authorized dispensing user bringing said mobile medications cart to a bedside of one of said patients on said patient care route;

(h) the authorized dispensing user scanning with said coded symbol reader of said cart the machine-readable identification of said one patient; whereupon the programmed controller of said cart unlocks or opens the medications compartment of said cart which has been assigned to said one patient;

(i) the authorized dispensing user removing each said prescribed medication from said compartment for administering of such medication to said one patient, and closing said medications compartment;

(j) the authorized dispensing user bringing said mobile medications cart to a bedside of a successive one of the patients on said patient care route; and (k) said authorized dispensing user repeating the aforesaid steps (h) to (I) for each of the patients on said patient care route.

3. The method of administering prescribed medications according to claim 2, comprising scanning a coded label on each such medication with said coded symbol reader.

4. The method of administering prescribed medications according to claim 2, comprising dispensing said prescribed medications according to a protocol of an existing electronic medications administration record system.

5. The method of administering medications according to claim 1, further including transferring at least one unit of medications for a selected patient on said care route from said central medications cabinet or carousel to said cart or to a bedside cabinet or carousel when said authorized dispensing user is not present with said cart at the central medications cabinet or carousel including placing in said coded symbol a predetermined second one of said delimiter characters to identify that said at least one unit of medications was obtained when the authorized dispensing user was not present with the cart at the central medications cabinet or carousel.

6. The method of administering medications according to claim 1, comprising maintaining an audit trail record of dispensing users obtaining each medication from said dispensing cabinet or carousel, identity of any pharmacy personnel placing said medication into said cart, patient identification for each said patient for whom said medications have been removed from said cart, time each said compartment on said cart was opened.

7. Method of administering prescribed medications to patients on a patient care route within a care facility, wherein an authorized medications dispensing user has a machine-readable user identification and each said patient has a machine-readable patient identification; the method comprising:

(a) one said authorized dispensing user bringing to a central medications cabinet or carousel in said care facility a mobile medications cart, the medications cart including a plurality of individual locking medications compartments, a viewing screen, a coded symbol reader, and a suitably programmed processor;

(b) the authorized dispensing user presenting the user's user identification to an ID reader of the central medications cabinet or carousel, whereupon the cabinet or carousel displays a coded symbol, the coded symbol containing data identifying said user, data identifying one of said patients on said patient care route; and an added delimiting character indicating that the authorized dispensing user is present with said medications cart at said central medications cabinet or carousel;

(c) said authorized dispensing user scanning the displayed coded symbol with the coded symbol reader of said cart, whereupon the programmed controller of said cart assigns one of said locking compartments of the cart to said one patient and unlocks or opens the assigned compartment;

(d) said authorized dispensing user obtaining one or more medications prescribed for said one patient, placing said one or more medications into said assigned compartment, and closing said compartment;

(e) said screen of said central medications cabinet or carousel displaying a successive coded symbol that contains data identifying said authorized dispensing user, data identifying a successive one of the patients on said patient care route, and said at least one additional character; and (f) said authorized dispensing user repeating the aforesaid steps (c) to (e) for each of the patients on said patient care route; and further including (g) transferring at least one unit of medications for a selected patient on said care route from said central medications cabinet or carousel to said cart or to a bedside cabinet or carousel when said authorized dispensing user is not present with said cart at the central medications cabinet or carousel;

wherein an authorized dispensing user presents the user's user identification to the ID reader of the central medications cabinet or carousel; the authorized dispensing user obtaining from said cabinet or carousel the at least one unit of medication for the patient on said patient care route; the cabinet or carousel printing out for each such unit of medication a label containing a coded symbol, the coded symbol containing data identifying said user, data identifying the selected one of said patients on said patient care route; and an added delimiting character different from the first-mentioned added delimiting character and indicating that the authorized dispensing user is not present with said medications cart at said central medications cabinet or carousel; and (h) the authorized dispensing user then bringing said one or more units of medication to said cart or to said bedside cabinet, and the authorized dispensing user scanning with said coded symbol reader on said cart or said bedside cabinet the machine-readable identification of said authorized dispensing user followed by the machine-readable identification of said one selected patient; whereupon the programmed controller of said cart unlocks or opens the medications compartment of said cart which has been assigned to said one selected patient; the authorized dispensing user scanning the coded symbol of each label or labels for said at least one additional medication with said coded symbol reader and placing said additional medication in said medications compartment.

8. The method of administering medications according to claim 7, further comprising said central medications cabinet or carousel producing said coded symbol with data identifying the dispensing act carried out at said cabinet or carousel when said cart is not present.

9. The method of administering medications according to claim 7, further comprising said cart or bedside cabinet assigning an unassigned compartment therein to said selected patient.

10. The method of administering medications according to claim 7, comprising maintaining an audit trail record of dispensing users obtaining each medication from said dispensing cabinet or carousel, identity of any pharmacy personnel placing said medication into said cart, patient identification for each said patient for whom said medications have been removed from said cart, time each said compartment on said cart was opened, and whether such medication was obtained from said dispensing cabinet or carousel without the medication cart present.

\* \* \* \* \*